US008116728B2

(12) United States Patent
Cai et al.

(10) Patent No.: US 8,116,728 B2
(45) Date of Patent: Feb. 14, 2012

(54) CHARGING IN LTE/EPC COMMUNICATION NETWORKS

(75) Inventors: Yigang Cai, Naperville, IL (US); Chung-Zin Liu, Naperville, IL (US)

(73) Assignee: Alcatel Lucent, Paris (FR)

( * ) Notice: Subject to any disclaimer, the term of this patent is extended or adjusted under 35 U.S.C. 154(b) by 872 days.

(21) Appl. No.: 12/107,507

(22) Filed: Apr. 22, 2008

(65) Prior Publication Data
US 2009/0264097 A1  Oct. 22, 2009

(51) Int. Cl.
*H04M 11/00* (2006.01)
(52) U.S. Cl. ............ 455/406; 455/466; 726/1; 705/1; 705/34
(58) Field of Classification Search .......... 455/406, 455/466; 370/331, 332; 705/1, 34; 726/1
See application file for complete search history.

(56) References Cited

U.S. PATENT DOCUMENTS

2009/0193433 A1* 7/2009 Maes ................. 719/315
2010/0217877 A1* 8/2010 Willars et al. ........... 709/228

FOREIGN PATENT DOCUMENTS
WO    WO 03025809 A2 * 3/2003

OTHER PUBLICATIONS

3GPP "3rd Generation Partnership Project; Technical Specification Group Services and System Aspects; Telecommunication Management; Study on Charging Management; 3GPP Evolved Packet Core (EPC): Charging aspects (Release 8)" 3GPP Draft: 322820-200, 3rd Generation Partnership Project (3GPP), Mobile Competence Centre; 650, Route Des Lucioles; F-06921 Sophia-Anapolis Cedex; France vol. TSG, SA, No. Mexico; 20071203.
"Digital Cellular Telecommunications system (Phase 2+); Universal Mobile Telecommunication System (UMTS); Policy and charging control architecture (3GPP TS 23.203 version 7.6.0 Release 7); ETSI TS 123 203" ETSI Standards, LIS Sophia Antipolis Cedex France, vol. 3-SA2, No. V7.6.0, Apr. 1, 2008.
"Digital Cellular Telecommunications system (Phase 2+); Universal Mobile Telecommunication System (UMTS); Charging Management; Charging management; Wireless Local Area Network (WLAN) charging (3GPP TS 32.252 version 7.0.0 Release 7); ETSI TS 132 252" ETSI Standards, LIS Sophia Antipolis Cedex France, vol. 3-SA5, No. V7.0.0, Jun. 1, 2007.

(Continued)

*Primary Examiner* — Dwayne Bost
*Assistant Examiner* — Amancio Gonzalez
(74) *Attorney, Agent, or Firm* — Duft Bornsen & Fishman LLP (57) ABSTRACT

Communication networks and methods are disclosed for performing charging in LTE/EPC communication networks. In an LTE/EPC communication network, a PCRF stores charging rules for online and offline charging. To perform charging for a session, LTE network elements that are serving the session request charging rules from the PCRF. The PCRF identifies the charging rules, and assigns a unique LTE charging identifier for the session across all network elements in the LTE/EPC communication network. The LTE network elements receive the charging rules from the PCRF along with the LTE charging identifier for the session. The LTE network elements generate charging messages for the session, and insert the LTE charging identifier in the charging messages. The LTE network elements then transmit the charging messages to a charging system, such as an OCS or an OFCS. The OCS/OFCS may then correlate the charging messages for the session based on the LTE charging identifier.

20 Claims, 8 Drawing Sheets

OTHER PUBLICATIONS

Samsung: Reference points renaming for 23.203 3GPP Draft; S2-081909 V1, 3rd Generation Partnership Project (3GPP), Mobile Competence Centre; 650, Route Des Lucioles; F-06921 Sophia-Antipolis Cedex; France, vol. CT WG1, No. Jeju Island; 20080327; Mar. 27, 2008.

Alcatel: "Message Flows for the Distribution of the Charging Correlation Information during the SIP Session Setup, call from the Applicant" 3GPP Draft; S2-020514, 3rd Generation Partnership Project (3GPP), Mobile Competence Centre; 650, Route Des Lucioles; F-06921 Sophia-Antipolis Cedex; France, vol. SA WG2, No. Sophia Antipolis, France; 20020218, Feb. 13, 2002.

Anonymous: "Telecommunications and Internet Converged Services and Protocols for Advanced Networking (TISPAN); NGN Management; Charging Specification for Release 1; Draft ETSI DTS 02032" ETSI Standards, LIS, Sophia, Antipolis Cedex, France, vol. TISPAN, No. Version 1, Oct. 1, 2005.

* cited by examiner

CHARGING IN LTE/EPC COMMUNICATION NETWORKS

BACKGROUND OF THE INVENTION

1. Field of the Invention

The invention is related to the field of communication networks and, in particular, to charging in LTE/EPC communication networks for non-roaming and roaming scenarios.

2. Statement of the Problem

Service providers typically provide numerous voice and/or data services to subscribers using one or more wireline and/or wireless communication networks. Exemplary services include cellular telephony, access to the Internet, gaming, broadcasting or multicasting of audio, video, and multimedia programming, etc. Mobile devices, such as cell phones, personal data assistants, smart phones, pagers, text messaging devices, global positioning system (GPS) devices, network interface cards, notebook computers, and desktop computers, may access the services provided by the communication networks over an air interface with one or more base stations. Communication between the mobile devices and base stations are governed by various standards and/or protocols, such as the standards and protocols defined by the 3rd Generation Partnership Project (3GPP, 3GPP2).

The service providers use offline and online charging functions to keep track of the charges incurred by each device for using the various services. The 3GPP/3GPP2 standards groups have defined a set of specifications that may be used to implement online charging systems and offline charging systems to cover charging in the various network domains (e.g., a circuit switching network domain, a packet switching network domain, and/or a wireless domain), IP multimedia subsystems, and emerging 3G/OMA application services.

Online charging is generally defined as a charging mechanism where charging information can affect, in real-time, the service rendered, and therefore a direct interaction of the charging mechanism with session/service control is needed. In online charging, charging information for network resource usage is collected concurrently with the resource usage. However, authorization for the network resource usage must be obtained by the network prior to the actual resource usage. The network elements in a communication network include Charging Trigger Functions (CTF). For online charging, the CTF triggers on charging events, collects charging information pertaining to the charging events, and assembles the charging information into matching charging events. The CTF then transmits credit request messages to the Online Charging System (OCS) to obtain authorization for the charging event/network resource usage requested by the user. The CTF delays the actual resource usage until permission has been granted by the OCS. When a granted quota of service units is obtained from the OCS, the CTF performs budget control during the resource usage. The CTF enforces termination of the end user's resource usage when permission by the OCS is not granted or expires.

Offline charging is generally defined as a charging mechanism where charging information does not affect, in real-time, the service rendered. In offline charging, charging information for network resource usage is collected concurrently with resource usage. The CTF triggers on charging events, collects charging information pertaining to the charging events, and assembles the charging information into matching charging events. The CTF then transmits accounting messages to a Charging Data Function (CDF).

There are a variety of types of networks operable to provide voice and data communications for mobile users. One present project within the 3GPP is the Long Term Evolution (LTE) which is a project to improve the UMTS mobile phone standard to cope with future requirements. The architecture defined by this project is referred to as the Evolved Packet System (EPS). The EPS architecture comprehends E-UTRAN (Evolved UTRAN) on the access side and EPC (Evolved Packet Core) on the core side.

One problem with LTE/EPC networks is that charging (i.e., a charging architecture and function) has not been effectively defined in detail. 3GPP TS 32.820 describes high level charging requirements for LTE/EPC networks in roaming and non-roaming scenarios. 3GPP TS 32.820 has copied the Packet Domain (PD) charging architecture and the WLAN charging architecture from 3GPP TS 32.251 and 32.252, respectively, but does not adequately describe charging in an LTE/EPC communication network or adequately describe an LTE/EPC charging architecture. Thus, network operators and designers are unsure how to implement online and offline charging in LTE/EPC communication networks.

SUMMARY OF THE SOLUTION

Embodiments of the invention solve the above and other related problems with a new LTE/EPC charging architecture that may be used for online and offline charging in LTE/EPC communication networks. In accordance with the charging architecture, a Policy and Charging Rule Function (PCRF) in the LTE/EPC communication network stores the charging rules for online and offline charging. In addition to storing the charging rules, the PCRF also assigns an LTE charging identifier for a session that is used by network elements (e.g., SGW, PDN-GW, HSGW, or Operator's IP Service (IMS)) for charging. Thus, a network element sends a request for policy and charging rules to the PCRF along with a network or service charging identifier (e.g., IMS network access uses IMS Charging ID (ICID), EPC access uses P-GW address and EPC Charging ID (ECID), WLAN access uses PDG address and WLAN Charging ID (WCID), fixed broadband access uses Multimedia Charging ID (MCID)). The PCRF associates different legs of the session from different network access over multiple reference points, and assigns a unique LTE charging identifier (LCID) to the same PDP context session (PCC session binding) for the user. When a network element in the LTE/EPC communication network generates a charging message destined for either the Online Charging System (OCS) or the Offline Charging System (OFCS) of the charging architecture, the network element inserts the LTE charging identifier in the charging message in addition to any network or access charging identifier. Thus, OCS and OFCS may advantageously correlate charging messages for the session based on the unique LTE charging identifier.

In one embodiment, an LTE/EPC communication network includes a PCRF and an LTE network element, such as a serving gateway (SGW), a Packet Data Network gateway (PDN-GW), a HRPD Serving gateway (HSGW), or an Operator's IP services (IMS). When in operation, the LTE network element requests policy and charging rules from the PCRF for a session involving a user. The PCRF identifies the charging rules for the user, and also assigns a unique LTE charging identifier for the session. Thus, responsive to the request, the LTE network element receives the charging rules from the PCRF along with the LTE charging identifier for the session. The LTE network element generates a charging message for the session, and inserts the LTE charging identifier in the charging message possibly along with any network or access charging identifier. The LTE network element then transmits the charging message to a charging system, such as the OCS or the OFCS. The OCS and the OFCS may then correlate the charging message with other charging messages for the session based on the LTE charging identifier.

The invention may include other exemplary embodiments described below.

DESCRIPTION OF THE DRAWINGS

The same reference number represents the same element or same type of element on all drawings.

DETAILED DESCRIPTION OF THE INVENTION

FIGS. 1-9 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
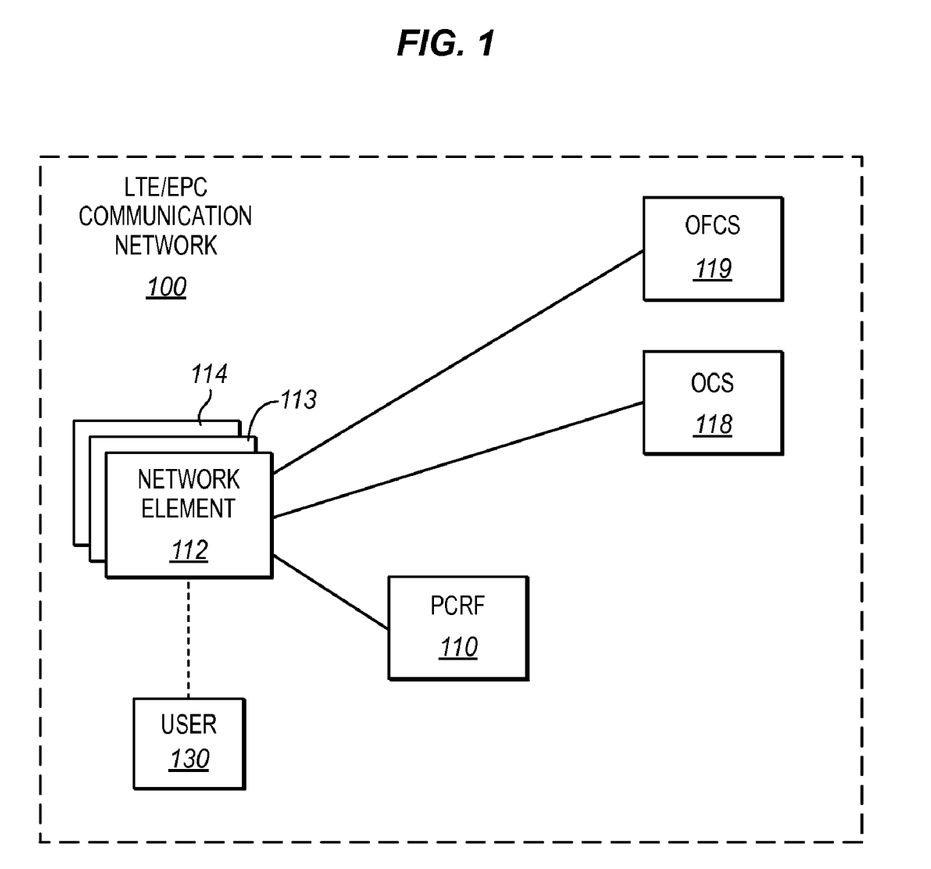
FIG. 1 illustrates an LTE/EPC communication network in an exemplary embodiment of the invention.

FIG. 1 illustrates a communication network 100 in an exemplary embodiment of the invention. Communication network 100 comprises an LTE/EPC network. Communication network 100 includes a Policy and Charging Rule Function (PCRF) 110 and a plurality of LTE network elements 112-114. PCRF 110 comprises any system, server, or function operable to store policy and charging rules for one or more users. Network elements 112-114 each comprise any system, server, or function operable to provide session control or provide a service for a session in communication network 100. Examples of network elements 112-114 include a serving gateway (SGW), a Packet Data Network gateway (PDN-GW), a HRPD Serving gateway (HSGW), and an Operator's IP services (IMS). Embodiments provided herein introduce a new charging architecture for LTE/EPC communication networks. For the charging architecture, communication network 100 includes an online charging system (OCS) 118 and an offline charging system (OFCS) 119.

In this embodiment, assume that user 130 registers or subscribes to service with communication network 100. User 130 has a properly-equipped communication device or user equipment (UE) for communication. Also assume that user 130 initiates or is invited into a session. For the session, network elements 112-114 (and possibly other network elements in communication network 100 that are not shown for the sake of brevity) are requested to provide a service for the session for user 130 or other parties to the session. Network elements 112-114 include a Charging Trigger Function (CTF) that is operable to identify the service being requested, and initiate charging for the service or session.

Figure 2:
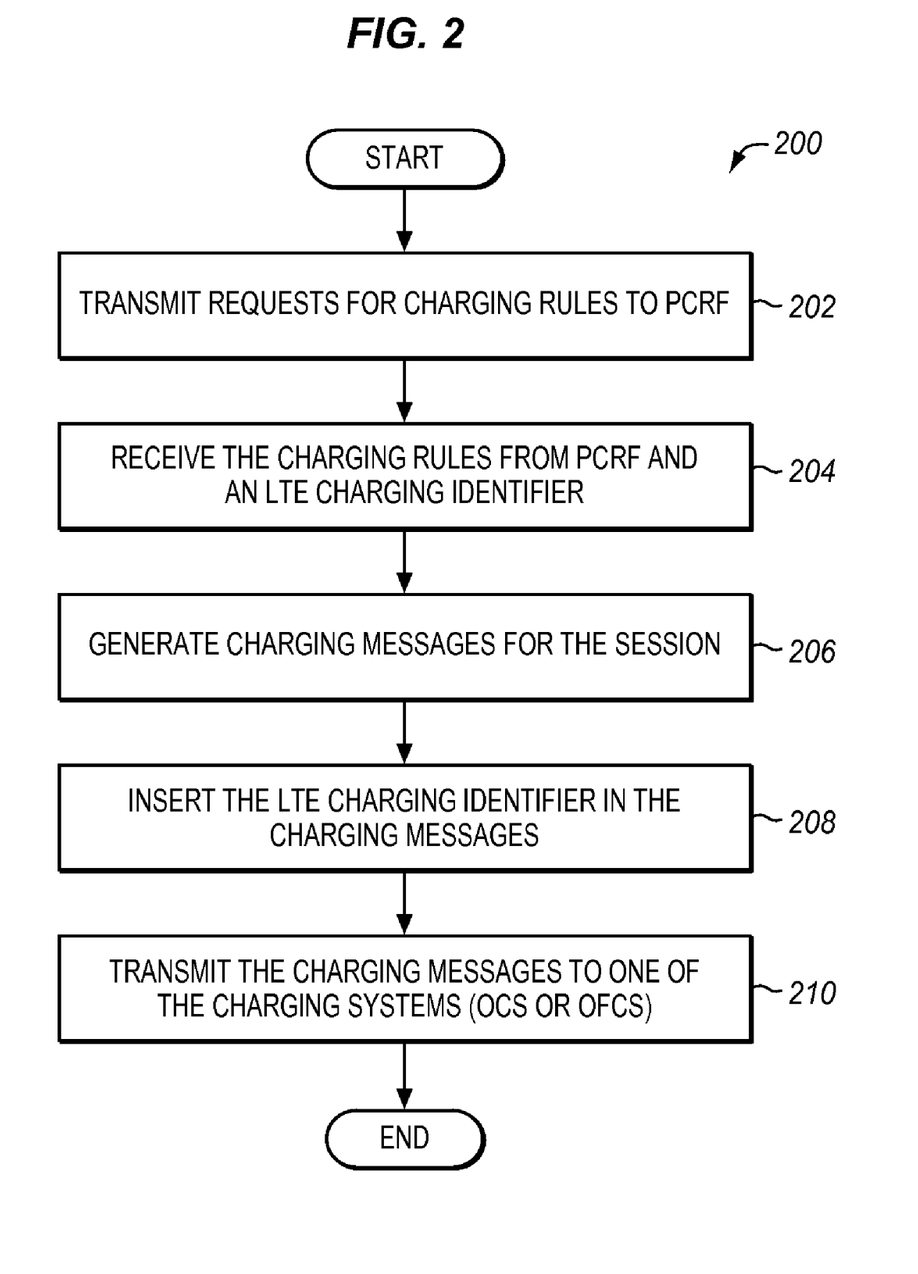
FIG. 2 is a flow chart illustrating a method of performing charging in network elements of a communication network in an exemplary embodiment of the invention.

FIG. 2 is a flow chart illustrating a method 200 of performing charging in network elements of communication network 100 in an exemplary embodiment of the invention. The steps of method 200 will be described with reference to communication network 100 in FIG. 1, although method 200 may be performed by other communication networks. The steps of the flow chart in FIG. 2 are not all inclusive and may include other steps not shown.

In step 202, network elements 112-114 (any or each) transmit requests for policy and charging rules to PCRF 110 for the session involving user 130. The charging rules allow network elements 112-114 to determine how charging is to be applied to the session. Network elements 112-114 may have already assigned a network or access charging identifier for the session, or may have identified a charging identifier already assigned to the session. For example, if IMS network access is employed by user 130 or another party to the session, then an IMS Charging ID (ICID) may have already been assigned for the session. In another example, if EPC access is employed by user 130 or another party to the session, then a P-GW address and EPC Charging ID (ECID) may have already been assigned for the session. In yet another example, if WLAN access is employed by user 130 or another party to the session, then a PDG address and WLAN Charging ID (WCID) may have already been assigned for the session. Network elements 112-114 may thus include the charging identifier in the request to PCRF 110.

Figure 3:
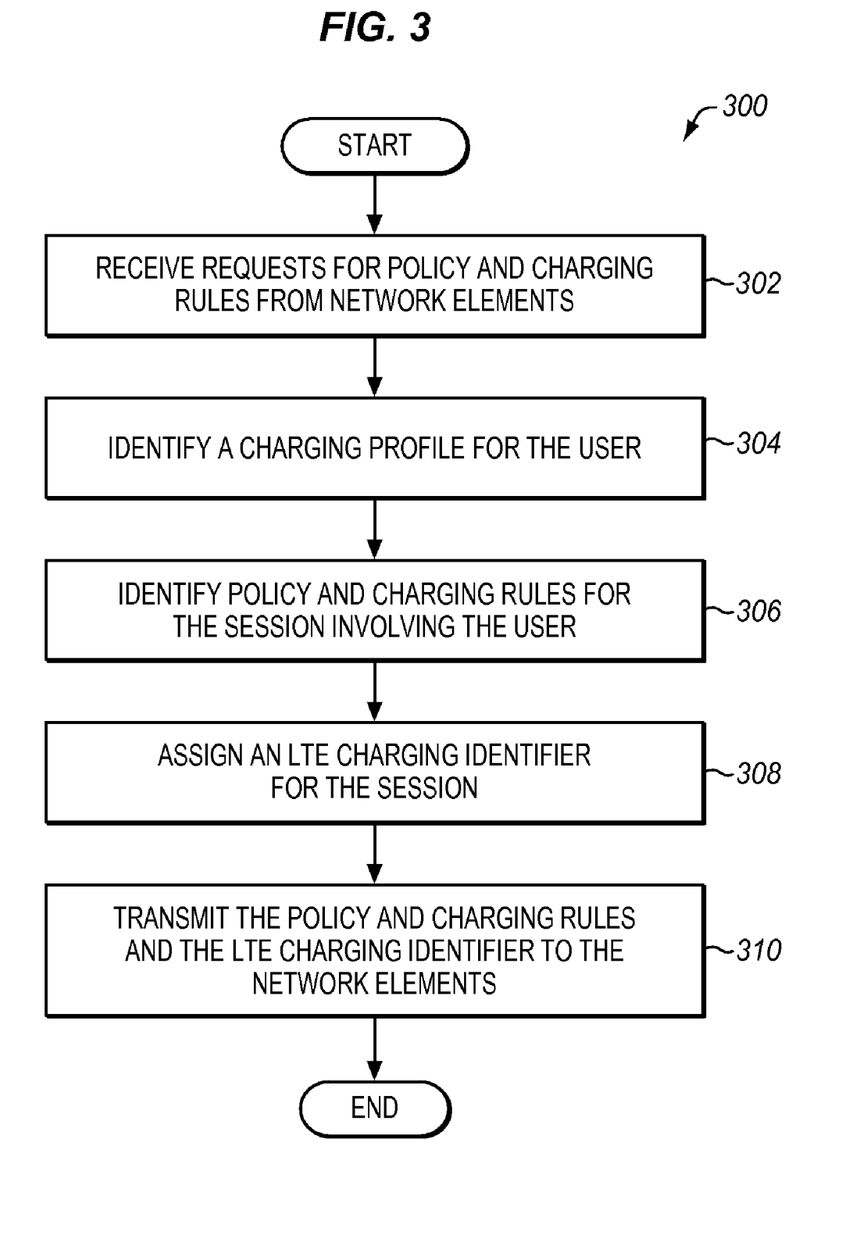
FIG. 3 is a flow chart illustrating a method of operating a PCRF in an exemplary embodiment of the invention.

In step 204, network elements 112-114 receive the charging rules from PCRF 110. Network elements 112-114 also receive an LTE charging identifier (LCID) from PCRF 110. The LTE charging identifier comprises any number, string, code, or other identifier that uniquely identifies charging data or charging records for the session. The LTE charging identifier may be associated with one or more network/access charging identifiers for the session which were supplied to PCRF 110 by network elements 112-114. The LTE charging identifier is assigned or defined by PCRF 110 as is shown in FIG. 3. The LTE charging identifier allows each network element 112-114 to uniquely indicate charging messages for the session to charging systems 118 and 119.

In step 206, network elements 112-114 generate charging messages for the session. The charging messages may take on a variety of forms based on the interface used between network elements 112-114 and the charging system (OCS 118 or OFCS 119). For example, the charging messages may comprise Diameter Ro messages to OCS 118, may comprise Diameter Rf messages to OFCS 119, may comprise CDRs to OFCS 119, or may comprise another type of charging messages. Network elements 112-114 then insert the LTE charging identifier in the charging messages in step 208. Network elements 112-114 also insert other charging data in the charging messages. For example, network elements 112-114 may insert the network or access charging identifiers in the charging messages in addition to the LTE charging identifier.

Figure 4:
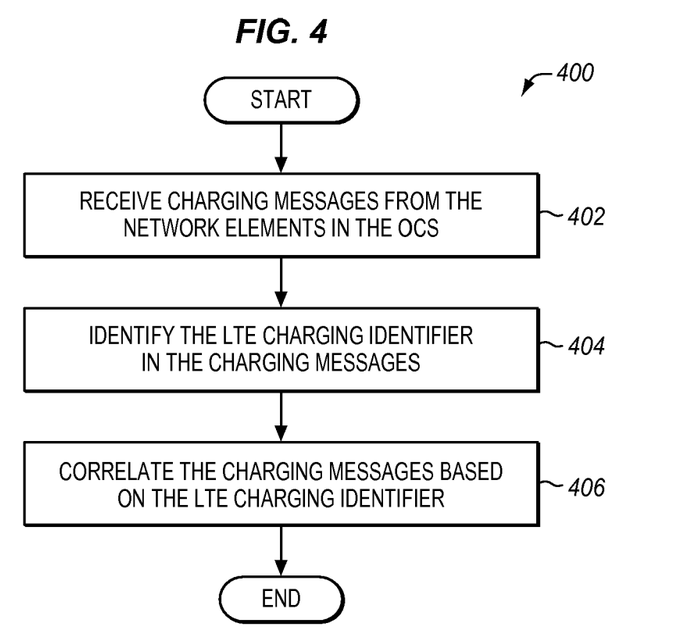
FIG. 4 is a flow chart illustrating a method of correlating charging messages in an OCS in an exemplary embodiment of the invention.
Figure 5:
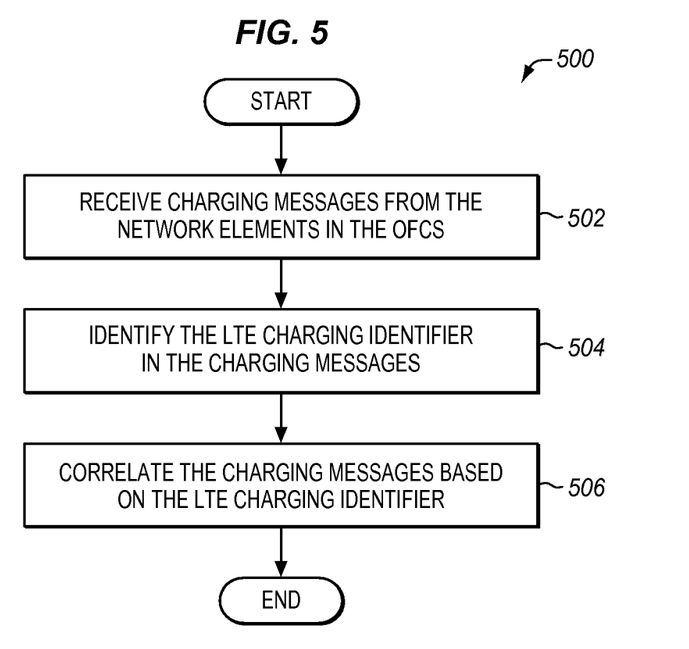
FIG. 5 is a flow chart illustrating a method of correlating charging messages in an OFCS in an exemplary embodiment of the invention.

In step 210, network elements 112-114 transmit the charging messages to one of the charging systems. If online charging is applied for the session, then network elements 112-114 transmit the charging messages to OCS 118. If offline charging is applied for the session, then network elements 112-114 transmit the charging messages to OFCS 119. The charging system that receives the charging messages may then use the LTE charging identifier to correlate charging messages for the same UE's session as is illustrated in FIGS. 4-5.

FIG. 3 is a flow chart illustrating a method 300 of operating PCRF 110 in an exemplary embodiment of the invention. The steps of method 300 will be described with reference to communication network 100 in FIG. 1, although method 300 may be performed by other communication networks. The steps of the flow chart in FIG. 3 are not all inclusive and may include other steps not shown.

In step 302, PCRF 110 receives the requests for policy and charging rules from network elements 112-114. Responsive to the requests, PCRF 110 identifies a charging profile for user 130 in step 304. Based on the charging profile for user 130, PCRF 110 identifies the policy and charging rules for a session involving user 130 in step 306.

PCRF 110 associates the network/access charging identifiers in a variety of ways to assign the LTE charging identifier. For example, the LTE charging identifier may comprise an association of a PCRF identity, an IMSI, and a Sequence Number but not the network/access address and charging ID. PCRF 110 may store the relationship between the assigned LTE charging identifier and the network/access charging identifiers for one UE session. This relationship may include mapping of the LTE charging identifier with a Network/Access Address and Charging ID, Access-Network-Information, Access-Network-Charging-Identifier, AF-Charging-Identifier, Subscription-ID, and timestamps of bearer/session starting point. The bearer level starting and stopping points timestamps are reported to PCRF 110 by network elements 112-114. For example, an SGW may send an access starting timestamp to PCRF 110 when transmitting the request for policy and charging rules. Before the SGW sends the access stopping timestamps to PCRF 110, when other network elements send requests to PCRF 110 with the same IMSI, the PCRF 110 will determine that those requests fall within the same session and assign the same LTE charging identifier to those flows or sessions. PCRF 110 will also use the received Network/Access Address and Charging ID, Access-Network-Information, Access-Network-Charging-Identifier, AF-Charging-Identifier, Subscription-ID, and timestamps of bearer/session starting point for the decision of LTE charging identifier and session identification. Sometimes, the SGW may not send a request to PCRF 110 but a PDN-GW will initiate a bearer level (IP-CAN bearer) request to PCRF 110. Then, PCRF 110 will use this information as a base to assign the LTE charging identifier to other flow and session IDs.

FIG. 4 is a flow chart illustrating a method 400 of correlating charging messages in OCS 118 in an exemplary embodiment of the invention. In step 402, OCS 118 receives the charging messages from network elements 112-114, and may also receive additional charging messages from network elements 112-114 and other network elements (not shown) in communication network 100. Each of the charging messages transmitted to OCS 118 by the network elements 112-114 include the unique LTE charging identifier. Thus, OCS 118 identifies the LTE charging identifier in the charging messages in step 404. OCS 118 then correlates the charging messages based on the LTE charging identifier in step 406.

In a similar manner, FIG. 5 is a flow chart illustrating a method 500 of correlating charging messages in OFCS 119 in an exemplary embodiment of the invention. In step 502, OFCS 119 receives the charging messages from network elements 112-114, and may also receive additional charging messages from network elements 112-114 and other network elements (not shown) in communication network 100. Each of the charging messages transmitted to OFCS 119 by the network elements 112-114 include the unique LTE charging identifier. Thus, OFCS 119 identifies the LTE charging identifier in the charging messages in step 504. OFCS 119 then correlates the charging messages based on the LTE charging identifier in step 506.

Figure 6:
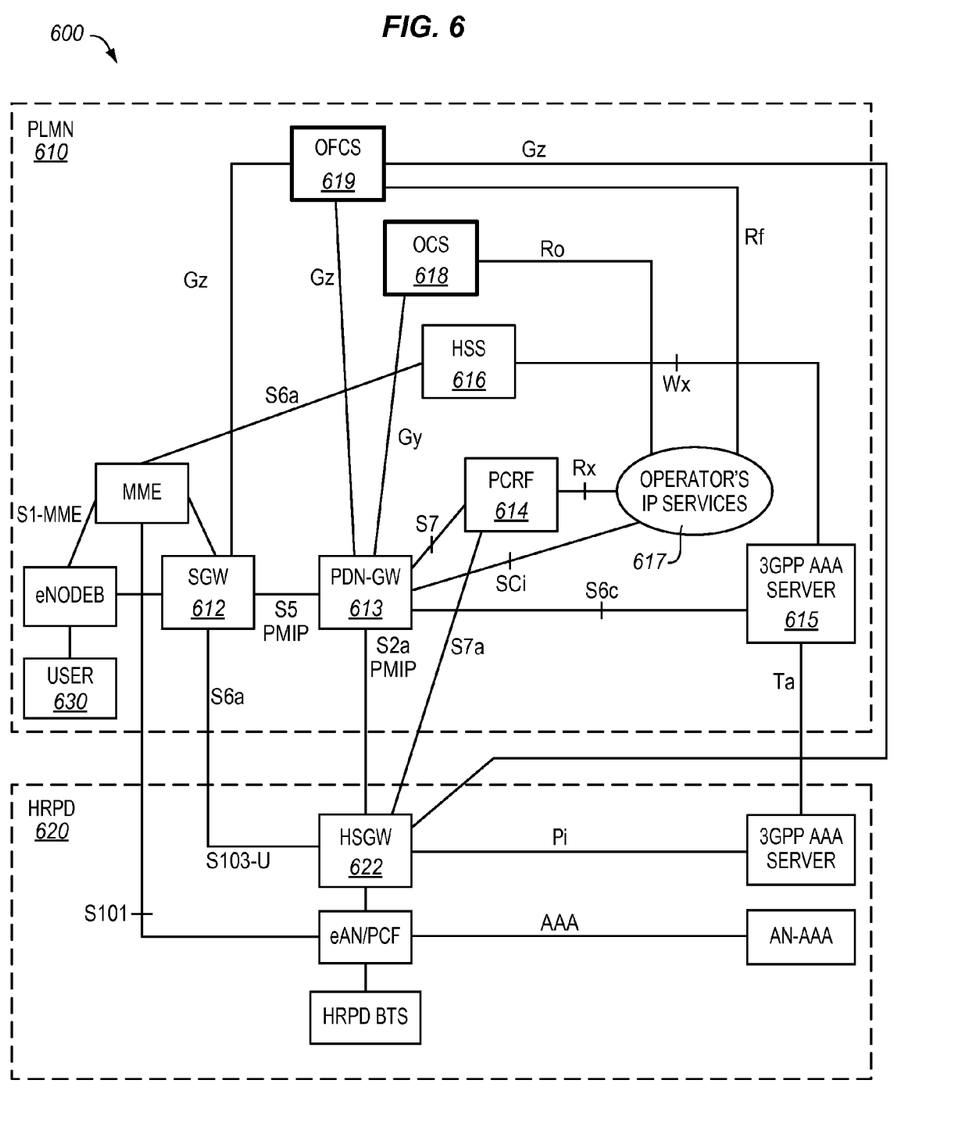
FIG. 6 illustrates an LTE/EPC communication network in a non-roaming scenario in an exemplary embodiment of the invention.

FIG. 6 illustrates an LTE/EPC communication network 600 in a non-roaming scenario in an exemplary embodiment of the invention. Communication network 600 includes a Public Land Mobile Network (PLMN) 610 comprised of a plurality of network elements, and an HRPD network 620. PLMN 610 includes a SGW 612, a PDN-GW 613, a PCRF 614, a 3GPP AAA server 615, a Home Subscriber Server (HSS) 616, and operators IP services 617 (i.e., an IMS network). PLMN 610 includes other network elements that are illustrated but not discussed for the sake of brevity. HRPD network 620 (also referred to as a CDMA network) includes an HSGW 622 and other network elements that are illustrated but not discussed for the sake of brevity.

The charging architecture for communication network 600 includes an OCS 618 and an OFCS 619 that are implemented in PLMN 610. In this charging architecture, PDN-GW 613 communicates with OCS 618 through a Diameter Gy interface or a modified Ro interface to support online charging. SGW 612, PDN-GW 613, and HSGW 622 communicate with OFCS 619 through a Gz interface or a modified Rf interface to support offline charging. PDN-GW 613 interfaces with SGW 612 by S5b PMIP interface, and interfaces with HSGW 622 by the S2a PMIP interface. Operator's IP services 617 interfaces with OCS 618 through a Diameter Ro interface, and with OFCS 619 through a Diameter Rf interface.

To perform offline charging, the network elements generate CDRs as described below. SGW 612 supports GPRS Tunneling Protocol (GTP) with user 630. GTP is an IP-based protocol used within GSM and UMTS networks. GTP-C is used within the GPRS core network for signalling between GPRS Support Nodes (GGSNs and SGSNs). This allows the SGSN to activate a session on the users behalf (PDP context activation), to deactivate the same session, to adjust quality of service parameters, etc. GTP-U is used for carrying user data within the GPRS core network and between the Radio Access Network and the core network. GTP' (GTP prime) uses the same message structure as GTP-C and GTP-U, and may be used for carrying charging data from the Charging Data Function of the GSM or UMTS network to the Charging Gateway Function.

The CDR generated by SGW 612 (the SGW CDR) may be enhanced from existing CDRs. For instance, the SGW CDR includes combined fields or combined charging data from an SGSN CDR (i.e., the CDR generated by the SGSN), a GGSN CDR (i.e., the CDR generated by the GGSN), a Mobility Management CDR, and/or other service CDRs (e.g., SMS or MMS). The CDR generated by PDN-GW 613 (the PDN-GW CDR) may be enhanced from existing records. For instance, the PDN-GW CDR includes fields or charging data from both a PDSN User Data Record (UDR) and a Flow Data Record (FDR). The CDR generated by HSGW 622 (the HSGW CDR) may also be enhanced from the existing PDSN UDR.

For instance, the HSGW CDR may include the PDSN UDR enhanced with an eHRPD Airline link and IP network information.

When SGW 612, PDN-GW 613, and HSGW 622 serve a session involving user 630 and need to generate charging messages, these network elements transmit requests for policy and charging rules to PCRF 614 for the session. PCRF 614 identifies the policy and charging rules for the session based on the requests, and also assigns an LTE charging identifier for the session. The requests for policy and charging rules from the network elements typically will include network/access charging identifiers that have already been assigned for the session. In assigning the LTE charging identifier, PCRF 614 may associate the network/access charging identifiers received in the requests. For example, the LTE charging identifier may comprise an association of a PCRF identity, an IMSI, and a Sequence Number but not the network/access address and charging ID. PCRF 614 may store the relationship between the assigned LTE charging identifier and the network/access charging identifiers for one UE session. This relationship may include mapping of the LTE charging identifier with a Network/Access Address and Charging ID, Access-Network-Information, Access-Network-Charging-Identifier, AF-Charging-Identifier, Subscription-ID, and timestamps of bearer/session starting point.

The network element receives the charging rules and the LTE charging identifier from PCRF 614. When the network element generates a charging message for the session, such as a CDR for an offline charging message, the network element inserts the LTE charging identifier in the charging message. The network element then transmits the charging message to OCS 618 or OFCS 619. The charging system that receives the charging message may then use the LTE charging identifier to correlate charging messages for the session. For example, if both LTE and eHPRD are deployed as illustrated in FIG. 6, then OFCS 619 needs to correlate CDRs from both LTE and eHPRD using the unique LTE charging identifier along with other network addresses and network/access charging identifiers. OFCS 619 thus correlates CDRs from each of the gateways using the LTE charging identifier.

LTE and eHPRD interworking supports both offline and online charging. Offline charging (post pay) is performed in SGW 612, PDN-GW 613, and HSGW 622. Online charging (pre-pay) is performed in PDN-GW 613. SGW 612 performs the following types of billing. One type is time-based billing, such as opening a timestamp and duration per user per PDP context and UE attachment. A SGW CDR is created (based on an existing SGSN CDR) when each user creates a PDP context between the UE of user 630 and SGW 612. A Mobility Management CDR is created when the UE performs attachment over LTE access. Another type of billing is volume-based billing. For volume-based billing, data volume is recorded in a SGW CDR per PDP context. Another type of billing is event-based billing. The SGW CDR for event-based billing may be enhanced from existing SMS CDRs, Location Request CDRs, and MBMS CDRs to record duration for each service.

To provide these types of billing, SGW 612 may collect charging information as described below. The charging information collected may include the usage of the radio interface. The charging information for usage of the radio interface describes the amount of data transmitted in Mobile Originated (MO) and Mobile Terminated (MT) directions categorized with QoS and user protocols. The charging information collected by SGW 612 may include the usage duration. The charging information for duration usage describes the duration of PDP context (IP-CAN bearer) over the time interval from PDP context activation to PDP context deactivation. The charging information collected by SGW 612 may include usage of the general PS domain resources. The charging information for usage of the general packet-switched (PS) domain resources describes the usage of other PS domain-related resources and the PS domain network activity (e.g. mobility management). The charging information collected by SGW 612 may include the destination and source, which describes the actual source addresses used by user 630 for the PDP context (IP-CAN bearer), and describes the destination addresses with a level of accuracy as determined by the Access Point Name (APN), and EPC charging identifier. The charging information collected by SGW 612 may include the location of the roaming user, home PLMN, visited PLMN, plus optional higher-accuracy location information.

PDN-GW 613 charging is billed by the following types: Time-based billing, volume-based billing, and event-based billing. LTE and CDMA charging is billed per transaction based on user per IMSI, QoS Class Indicator (QCI), flow (i.e., flow based charging with IP address and UDP port), application type (i.e., call forwarding, 411 call, SMS, location service, and quantity of file downloads or actual video streaming play time), content type (i.e., messaging, e-mail, application download, game session, etc), protocol type (i.e., FTP, RTP, RSTP, video, etc), and destination server (IP address or TCP/UDP port). If the interface between SGW 612 and PDN-GW 613 is PMIP, then PDN-GW 613 collects PMIP based charging records in the PDN-GW CDR which can be enhanced from PDSN User Data Record or UDR (for IP network part) and Flow Data Record or FDR. If the interface between SGW 612 and PDN-GW 613 is GTP, then PDN-GW 613 collects GTP based charging records in the PDN-GW CDR which can be enhanced from GGSN CDR and Flow Based Charging CDR.

PDN-GW 613 may collect the following charging information to perform charging. The charging information collected by PDN-GW 613 may include usage of the PMIP or GTP tunnel. The charging information for usage of the PMIP or GTP tunnel describes the amount of data transmitted in MO and MT directions categorized with QoS and user protocols. The charging information collected by PDN-GW 613 may include usage duration. The charging information for usage duration describes the duration of PMIP or GTP tunnel from tunnel activation to tunnel deactivation. The charging information collected by PDN-GW 613 may include usage of the external data networks. The charging information for usage of external data networks describes the amount of data sent to and received from the external data network. The external networks may be identified by the Access Point Name (APN).

When flow-based charging is supported within session-based charging, a flow ID is used to identify the service flow(s). Additional FBC information is collected in PDN-GW 613 as follows. The amount of data transmitted in MO and MT directions is collected and categorized by the rating group or combination of the rating group and service ID when volume-based charging applies. The duration of service data flows is collected and categorized by the rating group or combination of the rating group and service ID when time-based charging applies. The amount of events and corresponding timestamps are collected and categorized by the rating group or combination of the rating group and service ID when event-based charging applies.

Additional charging related actions may be supported in PDN-GW 613. PDN-GW 613 may deny the service. For example, PDN-GW 613 may deny the packet from a list of denied destination servers. PDN-GW 613 may be capable of mid session control for prepaid or subscription service with redirection capabilities. For example, PDN-GW 613 may redirect a session to a payment center if there is a billing issue for this user 630 or charging balance. PDN-GW 613 may provide Advice of Charging (AoC) if present balance is below a minimum threshold.

HSGW 622 charging is billed by the following types: Time-based billing (e.g., start timestamp and duration per subscriber per packet data session) and volume-based billing. For time-based billing, the HSGW CDR is created (based on existing PDSN UDR) for each A10 connection. Flow-based charging is supported in PDN-GW 613 instead of HSGW 622. For volume-based billing, data volume is recorded in the HSGW CDR.

HSGW 622 may collect the following charging information to perform charging. The charging information collected by HSGW 622 may include the usage of the radio interface. The charging information for usage of the radio interface describes the amount of data transmitted in MO and MT directions categorized with QoS flow. This airlink record is passed from RAN over A10 and includes A10 setup, start, and stop airlink records. Session status and activities are also included here. The charging information collected by HSGW 622 may include the usage duration. The charging information for duration usage describes the duration of a packet data session as the time interval from packet data session activation to session deactivation. The charging information collected by HSGW 622 may include usage of EPC domain resources and mobility. The charging information may describe infrastructure identifications and Mobility Management (e.g. Simple IP mobility). The charging information collected by HSGW 622 may include the destination and source, which describes the actual source addresses used by the user for the PDP context (IP-CAN bearer), and describes the destination addresses with a level of accuracy as determined by the Access Point Name (APN).

The network elements will transfer CDRs generated locally to OFCS 619 via Ga interface. OCFS 619 then will correlate all CDRs in the session with the same LTE charging identifier into a consolidated CDR for billing.

In an alternative for performing offline charging, the network elements will include charging information, network/access charging address, network/access charging identifier, and LTE charging identifier in a Diameter Rf ACR message and send to OFCS 619 which will generate the CDR. OFCS 619 then aggregates and correlates CDRs with the same LTE charging identifier into one consolidated CDR for billing.

Figure 7:
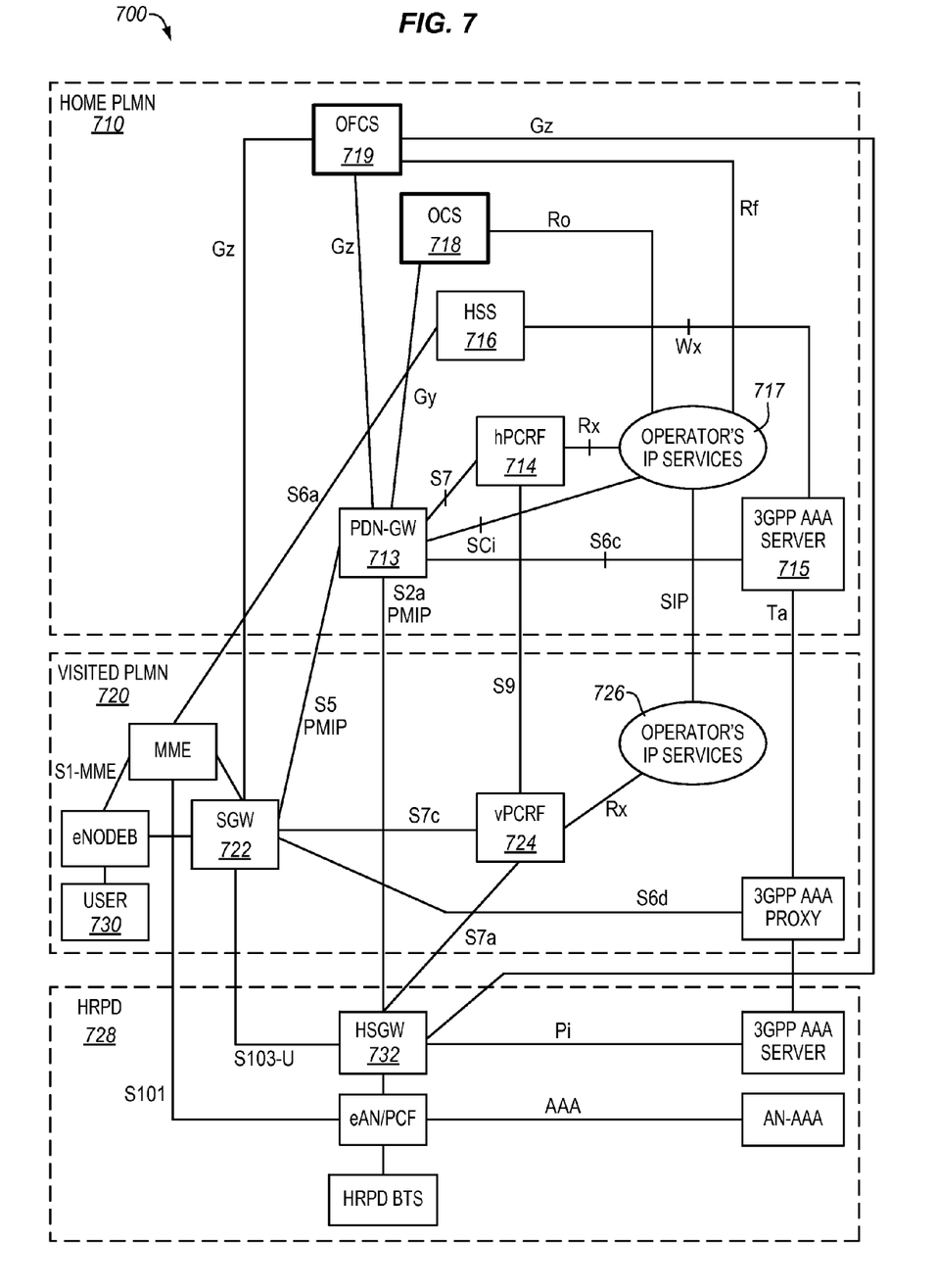
FIG. 7 illustrates an LTE/EPC communication network in a roaming scenario in an exemplary embodiment of the invention.

FIG. 7 illustrates an LTE/EPC communication network 700 in a roaming scenario (home routed traffic plus PMIP) in an exemplary embodiment of the invention. Communication network 700 includes a home PLMN 710 comprised of a plurality of network elements, a visited PLMN 720 comprised of a plurality of network elements, and an HRPD network 728. Home PLMN 710 includes a PDN-GW 713, a home PCRF (hPCRF) 714, a 3GPP AAA server 715, an HSS 716, a home operator's IP services 717 and other network elements that are illustrated but not discussed for the sake of brevity. Visited PLMN 720 includes a SGW 722, a visited PCRF (vPCRF) 724, a visited operator's IP services 726, and other network elements that are illustrated but not discussed for the sake of brevity. HRPD network 728 includes an HSGW 732 and other network elements that are illustrated but not discussed for the sake of brevity.

The charging architecture for communication network 700 includes a home OCS 718 and a home OFCS 719 that are implemented in home PLMN 710. In this charging architecture, PDN-GW 713 communicates with home OCS 718 through a Gy interface or a modified Ro interface to support online charging. SGW 722, PDN-GW 713, and HSGW 732 communicate with home OFCS 719 through a Gz interface or a modified Rf interface to support offline charging. PDN-GW 713 interfaces with SGW 722 by S8b PMIP (instead of S5b) interface, and interfaces with HSGW 732 by the PMIP interface.

A similar procedure for charging is performed as described for the non-roaming scenario. The network elements use the enhanced CDRs or Diameter Rf interface as described above and the LTE charging identifier so that charging messages may be correlated for the session. Also, home PCRF 714 provides dynamic charging rules to PDN-GW 713 through the S7 interface. Home PCRF 714 also provides dynamic charging rules to visited PCRF 724, which passes these charging rules to HSGW 732 and SGW 722 through the S7a/S7c interfaces. In this architecture, home PCRF 714 will associate network/access charging identifiers from both of visited and home network elements with a unique LTE charging identifier, and provides the LTE charging identifier along with policy and charging rules back to network elements. Home PCRF 714 also provides the LTE charging identifier to visited PCRF 724, so it can relay LTE charging identifier to network elements in visited PLMN 720. This interaction between home PCRF 714 and visited PCRF also applies in FIGS. 8-9.

Figure 8:
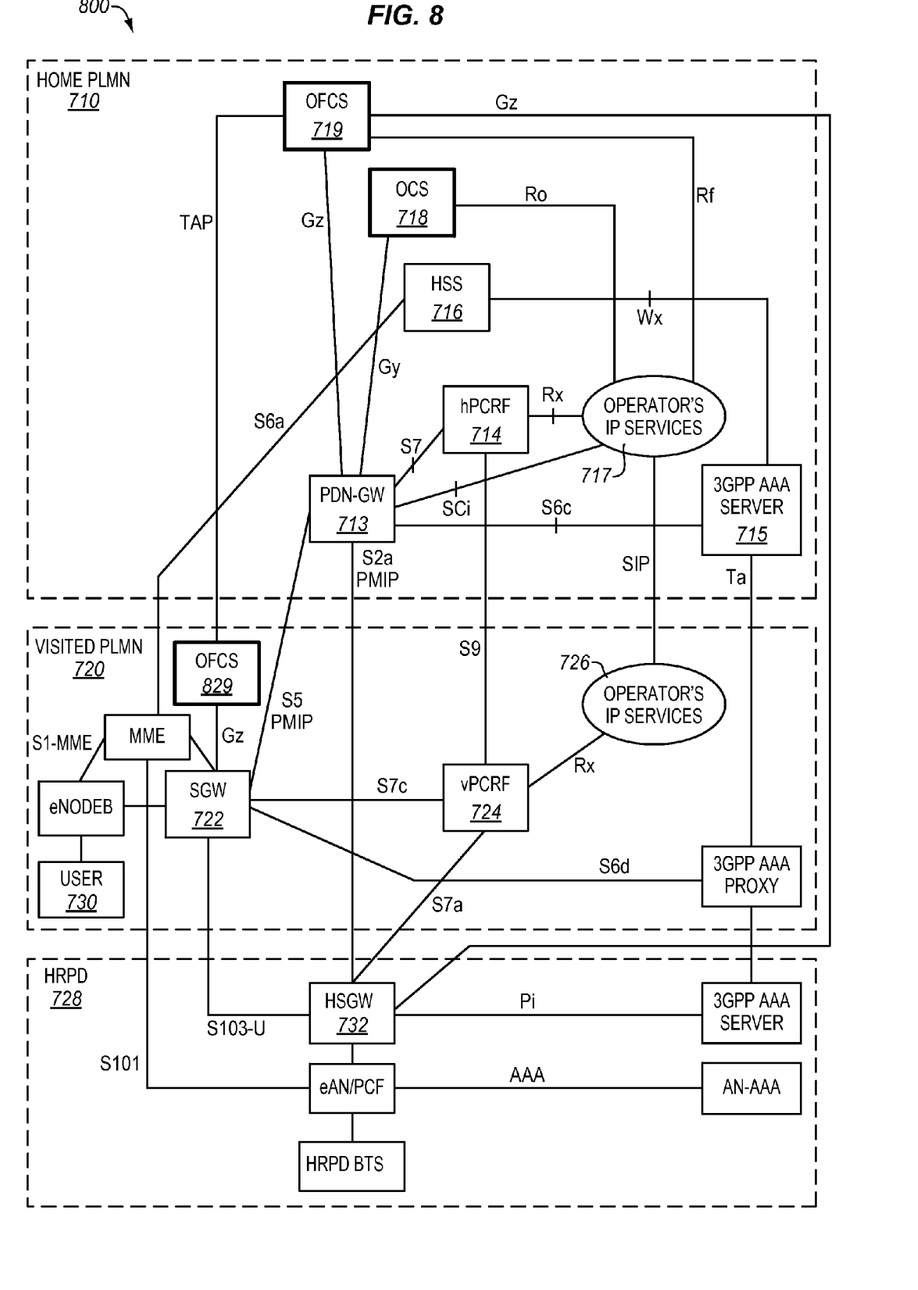
FIG. 8 illustrates an LTE/EPC communication network in another roaming scenario in an exemplary embodiment of the invention.

The assumption for FIG. 7 is that communication network 700 has a common network operator. However, if there is an inter-operator scenario, then the charging architecture may be altered as shown in FIG. 8. FIG. 8 illustrates an LTE/EPC communication network 800 in another roaming scenario (home routed traffic plus GTP) in an exemplary embodiment of the invention. Communication network 800 resembles communication network 700 shown in FIG. 7, except that visited PLMN 720 includes a visited OFCS 829, which may also be referred to as a proxy OFCS. SGW 722 communicates with visited OFCS 829 through a Gz or modified Rf interface. There is a Transferred Account Procedure (TAP) interface between home OFCS 719 and visited OFCS 829. Visited PLMN 720 may collect a local CDR from SGW 722 and store in visited OFCS 829 which coordinates with home OFCS 719 in via TAP. PDN-GW 713 may interface with SGW 722 by S8a GTP (instead of S8b) interface. The PDN-GW CDR may be enhanced from Packet Core GGSN CDR and FBC CDR.

Figure 9:
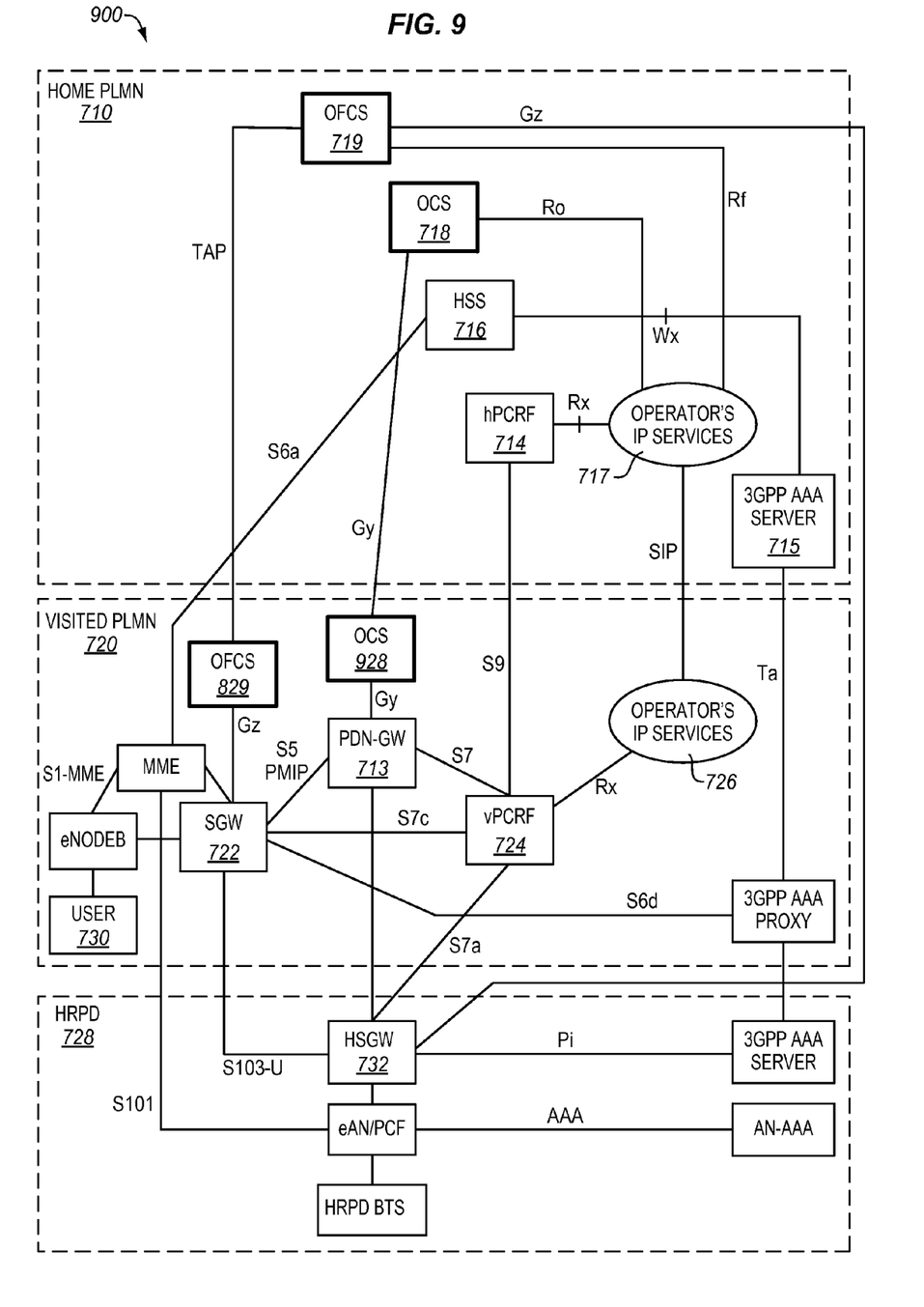
FIG. 9 illustrates an LTE/EPC communication network in another roaming scenario in an exemplary embodiment of the invention.

FIG. 9 illustrates an LTE/EPC communication network 900 in yet another roaming scenario (local breakout) in an exemplary embodiment of the invention. Communication network 900 resembles communication network 800 shown in FIG. 8, except that PDN-GW 713 is implemented in visited PLMN 720. Also, the charging architecture further includes a visited OCS 928 in visited PLMN 720, which may also be referred to as a proxy OCS. Visited OCS 928 transmits an online charging request message to home OCS 718 requesting charging information for the roaming user 730. Visited OCS 928 receives an online charging response message from home OCS 718 that includes the charging information for the roaming user 730, such as information on the subscriber profile of the user 130, an allotment of service units for user 130, or other information used to generate a rating for the session or for performing credit control in the visited PLMN 720. Visited OCS 928 then processes the charging information to perform credit control for one or more network elements in the visited PLMN 720 that is serving the session. To perform credit control, visited OCS 928 may process the charging information to identify an allotment of service units granted by home OCS 718. Visited OCS 928 may then determine a rating for the session, and grant a quota of service units to the network elements in visited PLMN 720 based on the allotment of service units and the rating.

Although specific embodiments were described herein, the scope of the invention is not limited to those specific embodiments. The scope of the invention is defined by the following claims and any equivalents thereof.

We claim:

1. A Long Term Evolution/Evolved Packet Core (LTE/EPC) communication network, comprising:
   a Policy and Charging Rules Function (PCRF) operable to store charging rules for a user; and
   a plurality of LTE network elements operable to transmit requests for charging rules to the PCRF for a session involving the user, to receive the charging rules from the PCRF along with an LTE charging identifier which is associated with network/access charging identifiers provided to the PCRF from the LTE network elements, to generate charging messages for the session, to insert the LTE charging identifier in the charging messages, and to transmit the charging messages to a charging system.

2. The LTE/EPC communication network of claim 1 wherein the charging messages comprises Charging Data Records (CDR) used for offline charging.

3. The LTE/EPC communication network of claim 2 wherein the LTE network elements include a serving gateway (SGW) and the CDR includes combined charging data from at least an SGSN CDR, a GGSN CDR, and a Mobility Management CDR.

4. The LTE/EPC communication network of claim 2 wherein the LTE network elements include a Packet Data Network Gateway (PDN-GW) and the CDR includes combined charging data from at least a PDSN User Data Record (UDR) and a Flow Data Record (FDR).

5. The LTE/EPC communication network of claim 2 wherein the LTE network elements include a High Rate Packet Data (HRPD) Serving Gateway (HSGW) and the CDR includes a PDSN User Data Record (UDR) enhanced with charging data from an eHRPD Airline link.

6. The LTE/EPC communication network of claim 1 wherein an interface between the LTE network elements and an Offline Charging System (OFCS) for offline charging comprises a Diameter Rf interface, and the charging messages that include the LTE charging identifier comprise Diameter Rf messages.

7. The LTE/EPC communication network of claim 1 further comprising:
   the charging system operable to receive the charging messages from the LTE network element, to identify the LTE charging identifier in the charging messages, and to correlate the charging messages for the session based on the LTE charging identifier.

8. The LTE/EPC communication network of claim 1 wherein:
   the PCRF is further operable to receive the requests for the charging rules from the LTE network elements wherein the requests include at least one network/access charging identifier, to identify a charging profile for the user, to identify the charging rules for the session, to assign the LTE charging identifier for the session by associating the network/access charging identifiers received in the requests, and to transmit the charging rules and the LTE charging identifier to the LTE network elements.

9. A method of performing charging in a Long Term Evolution/Evolved Packet Core (LTE/EPC) communication network that comprises a plurality of LTE network elements, the method comprising:
   transmitting requests for charging rules from the LTE network elements to a Policy and Charging Rules Function (PCRF) for a session involving a user;
   receiving the charging rules from the PCRF in the LTE network element along with an LTE charging identifier which is associated with network/access charging identifiers provided to the PCRF from the LTE network elements;
   generating charging messages for the session;
   inserting the LTE charging identifier in the charging messages; and
   transmitting the charging messages to a charging system.

10. The method of claim 9 wherein the charging messages comprise Charging Data Records (CDR) used for offline charging.

11. The method of claim 10 wherein the LTE network elements include a serving gateway (SGW) and the CDR includes combined charging data from at least an SGSN CDR, a GGSN CDR, and a Mobility Management CDR.

12. The method of claim 10 wherein the LTE network elements includes a Packet Data Network Gateway (PDN-GW) and the CDR includes combined charging data from at least a PDSN User Data Record (UDR) and a Flow Data Record (FDR).

13. The method of claim 10 wherein the LTE network elements include a High Rate Packet Data (HRPD) Serving Gateway (HSGW) and the CDR includes a PDSN User Data Record (UDR) enhanced with charging data from an eHRPD Airline link.

14. The method of claim 9 wherein an interface between the LTE network elements and an Offline Charging System (OFCS) for offline charging comprises a Diameter Rf interface, and the charging messages that include the LTE charging identifier comprise Diameter Rf messages.

15. The method of claim 9 further comprising:
   receiving the charging messages from the LTE network elements in the charging system;
   identifying the LTE charging identifier in the charging messages; and
   correlating the charging messages for the session based on the LTE charging identifier.

16. The method of claim 9 further comprising:
   receiving the requests for the charging rules from the LTE network elements in the PCRF wherein the requests include at least one network/access charging identifier;
   identifying a charging profile for the user;
   identifying the charging rules for the session;
   assigning the LTE charging identifier for the session by associating the network/access charging identifiers received in the requests; and
   transmitting the charging rules and the LTE charging identifier to the LTE network elements.

17. A system comprising:
   a Policy and Charging Rules Function (PCRF) operable to:
      receive requests for charging rules from a plurality of Long Term Evolution (LTE) network elements that are serving a session for a user, wherein the requests include at least one network/access charging identifier already assigned to the session,
      identify a charging profile for the user,
      identify the charging rules for the session,
      assign an LTE charging identifier for the session by associating the network/access charging identifiers received in the requests, and
      transmit the charging rules and the LTE charging identifier to the LTE network elements.

18. The system of claim 17 wherein, in a roaming scenario, the PCRF in a home Public Land Mobile Network (PLMN) is further operable to provide the LTE charging identifier to a visited PCRF in a visited PLMN.

19. The system of claim 17 further comprising:
the plurality of LTE network elements;
an online charging system (OCS); and
an offline charging system (OFCS);
wherein the at least one of the LTE network elements interfaces with the OCS over a Diameter Ro interface, and interfaces with the OFCS over a Diameter Rf interface.

20. The system of claim 17 further comprising:
the plurality of LTE network elements that are operable to transmit the requests for charging rules to the PCRF, to receive the charging rules from the PCRF along with the LTE charging identifier which is associated with network/access charging identifiers provided to the PCRF from the LTE network elements, to generate charging messages for the session, to insert the LTE charging identifier in the charging messages, and to transmit the charging messages to a charging system.

* * * * *

UNITED STATES PATENT AND TRADEMARK OFFICE
CERTIFICATE OF CORRECTION

PATENT NO. : 8,116,728 B2  Page 1 of 1
APPLICATION NO. : 12/107507
DATED : February 14, 2012
INVENTOR(S) : Cai et al.

It is certified that error appears in the above-identified patent and that said Letters Patent is hereby corrected as shown below:

The missing text below should be inserted in column 5 line 25

--PCRF 110 also assigns the LTE charging identifier for the session in step 308. As previously mentioned, the requests for policy and charging rules from network elements 112-114 typically will include network or access charging identifiers that have already been assigned for the session. In assigning the LTE charging identifier, PCRF 110 may associate the network/access charging identifiers received in the requests. PCRF 110 may then store the conditions and other data which was used to associate the network/access charging identifiers from the requests to assign the LTE charging identifier. In step 310, PCRF 110 transmits the charging rules and the LTE charging identifier to network elements 112-114.--

Signed and Sealed this
Fifteenth Day of May, 2012

David J. Kappos
*Director of the United States Patent and Trademark Office*